US009653913B2

(12) United States Patent
Bentley

(10) Patent No.: US 9,653,913 B2
(45) Date of Patent: May 16, 2017

(54) RESISTANCE CHANGE DEVICE PROVIDING OVERCURRENT PROTECTION

(71) Applicant: LITTELFUSE, INC., Chicago, IL (US)

(72) Inventor: Gary Mark Bentley, England (GB)

(73) Assignee: Littelfuse, Inc., Chicago, IL (US)

( * ) Notice: Subject to any disclaimer, the term of this patent is extended or adjusted under 35 U.S.C. 154(b) by 148 days.

(21) Appl. No.: 14/624,142

(22) Filed: Feb. 17, 2015

(65) Prior Publication Data
US 2016/0241023 A1   Aug. 18, 2016

(51) Int. Cl.
*H02H 9/04* (2006.01)
*H02H 9/02* (2006.01)

(52) U.S. Cl.
CPC ............ *H02H 9/025* (2013.01); *H02H 9/041* (2013.01)

(58) Field of Classification Search
CPC ....................................................... H02H 9/041
USPC .......................................................... 361/56
See application file for complete search history.

(56) References Cited

U.S. PATENT DOCUMENTS

| 4,117,350 A | * | 9/1978 | Kalfus | ................. | H03K 17/732 327/441 |
| 5,657,195 A | * | 8/1997 | Rault | ..................... | H02H 3/025 361/100 |
| 6,373,672 B1 | * | 4/2002 | Quoirin | ............... | H01L 27/0623 361/100 |
| 7,019,382 B2 | * | 3/2006 | Litwin | ................ | H01L 27/0251 257/528 |
| 7,433,166 B1 | * | 10/2008 | Pezzani | ................... | H01L 29/74 257/E29.211 |

* cited by examiner

Primary Examiner — Scott Bauer

(57) ABSTRACT

An overcurrent protection device may include an input terminal to receive an input current; an output terminal coupled to the input terminal; and a current limiter circuit integrated into the silicon substrate and arranged between the input terminal and output terminal. The current limiter circuit may include a series pass element having a pass state characterized by a first electrical resistance and a limit state characterized by a second electrical resistance higher than the first electrical resistance, the series pass element comprising a series current sense element integrated into the silicon substrate and configured to receive the input current and to output a sense voltage based upon the received input current, wherein the series pass element is configured to place the current limiter circuit into the limit state when the sense voltage indicates that the input current exceeds a predetermined level.

12 Claims, 10 Drawing Sheets

RESISTANCE CHANGE DEVICE PROVIDING OVERCURRENT PROTECTION

BACKGROUND

Field of the Disclosure

The present embodiments relate to the field of circuit protection devices. More particularly, the present embodiments relate to a protection device providing overcurrent protection by triggering a resistance change.

Discussion of Related Art

Circuit protection devices form an electrical connection with a component or components in a circuit to be protected. Certain of these protection devices are used to protect circuits from excessive current while other devices may provide protection against overvoltage transients when a voltage spike occurs. One type of device used for overvoltage protection is a Zener diode which is designed to have a specific reverse breakdown voltage which is the conduction voltage when the diode is reverse biased. This is controlled by doping of the p-n junction allowing electrons to tunnel from the p-type material to the n-type material. Another type of overvoltage protection device is an avalanche breakdown diode which operates in carrier impact multiplication at avalanche breakdown when an overvoltage condition occurs.

Fuses (or fusible links) represent a common type of protection device used to limit or terminate current. A fuse may limit or terminate current by providing an open circuit when current conducted through the fuse exceeds a predetermined limit, which varies among different fuses according to the fuse rating. While the fuse action may be useful to ensure that current that may conducted through a device or circuits to be protected does not exceed a safe value, one disadvantage is that once the fuse opens, the protected elements may be rendered inactive until fuse replacement. While certain types of overvoltage protection devices may be reversible, an overvoltage protection device may not serve the same over current protection functions as a fuse may supply. It is with respect to these and other considerations that the present improvements have been needed.

BRIEF SUMMARY

In one embodiment, an overcurrent protection device integrated into a silicon substrate includes an input terminal to receive an input current; an output terminal coupled to the input terminal; and a current limiter circuit integrated into the silicon substrate and arranged between the input terminal and output terminal and comprising: a series pass element having a pass state characterized by a first electrical resistance and a limit state characterized by a second electrical resistance higher than the first electrical resistance, the series pass element comprising a series current sense element integrated into the silicon substrate and configured to receive the input current and to output a sense voltage based upon the received input current, wherein the series pass element is configured to place the current limiter circuit into the limit state when the sense voltage indicates that the input current exceeds a predetermined level.

In a further embodiment, a method of limiting current using an overcurrent protection device integrated into a silicon substrate may include transmitting an input current from an input terminal to output terminal via a series pass element integrated into the silicon substrate when the series pass element is in a pass state having a first electrical resistance, detecting that an input current has reached a predetermined level using a series current sense element; switching the series pass element to a limit state having a second electrical resistance that is higher than the first electrical resistance; and transmitting the input current from the input terminal to output terminal via the series pass element in the limit state, wherein the input current does not exceed the predetermined level.

DESCRIPTION OF EMBODIMENTS

Figure 1A:
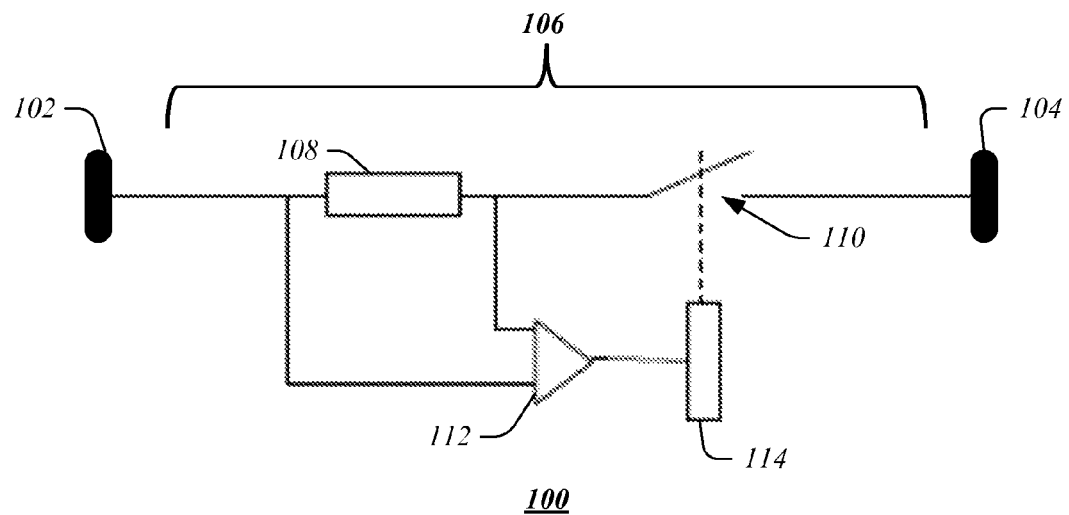
FIG. 1A depicts an embodiment of a current limiter circuit according to embodiments of the disclosure.

The present embodiments will now be described more fully hereinafter with reference to the accompanying drawings, in which various embodiments are shown. The embodiments may be embodied in many different forms and are not to be construed as limited to the embodiments set forth herein. These embodiments are provided so that this disclosure will be thorough and complete, and will fully convey the scope of the embodiments to those skilled in the art. In the drawings, like numbers refer to like elements throughout.

In various embodiments of the disclosure an apparatus may include a protection circuit in the form of a bi-stable over-current limiter that is integrated into a silicon substrate. The bi-stable over-current limiter may be characterized by two stable states. Notably, unlike the operation of known fuses, the bi-stable over-current limiter may be switched back and forth between stable states. In various embodiments the apparatus may include an input terminal to receive an input current, an output terminal coupled to the input terminal, as well as a current limiter circuit that includes a series pass element disposed between that input terminal and output terminal and series sense element that is integrated into the silicon substrate. The series pass element may have a pass state having a first electrical resistance and a limit state having a second electrical resistance that is higher than the first electrical resistance. The series current sense element may be configured to detect the input current and to output a sense voltage based upon the detected input current, wherein the series pass element is configured to place the current limiter circuit in the limit state when the sense voltage indicates that the input current exceeds a predetermined level.

In various embodiments, a shunt overvoltage protection circuit may also be included with a current limiter. The shunt overvoltage protection may be provided independently of the overcurrent circuit in some embodiments, or shunt overvoltage may be used to trigger current limiting circuitry in other embodiment.

For example, in particular embodiments, the protection circuit may include a series current limiter stage and further include a shunt overvoltage stage that is coupled to the input terminal and output terminal, and is arranged along an electrical path that is electrically parallel to a first current path, wherein the shunt overvoltage stage is configured to limit current between the input terminal and output terminal when main voltage detected at the input terminal or output terminal exceeds a predetermined main voltage level.

In some embodiments, the series pass element may be configured as a uni-directional pass element, while in other embodiments the series pass element may be configured as a bi-directional pass element. In additional embodiments the shunt overvoltage stage may include a uni-directional or bi-directional (3 terminal) overvoltage element. In particular embodiments, and additional terminal may provide state changes between two 4-terminal devices.

FIG. 1A depicts an embodiment of a current limiter circuit 100 according to embodiments of the disclosure. In the present embodiments, at least some of the components of the current limiter circuit 100 may be embodied in a silicon substrate. The current limiter circuit 100 includes an input terminal 102 and output terminal 104. The current limiter circuit 100 may be arranged to protect other components (not shown) by limiting maximum current that may be conducted through a component or component. The current limiter circuit 100 includes a resistor 108 that is arranged in a current path 106 that extends between the input terminal 102 and output terminal 104. A current limiter 110 is also arranged in the current path 106 and is illustrated for simplicity as a switch. The current limiter (switch) 110 may exist in two different stable states that impart two different resistances, for example, to the current path 106 that extends between the input terminal 102 and output terminal 104. As shown in FIG. 1A, the current limiter circuit 100 also includes a sense element 112 that may be arranged to detect pass current that flows along the current path 106. For example, with aid or resistor 108 a sense voltage may be detected across the sense element 112. The sense element 112 and current limiter 110 may act as a pass circuit or pass element that operates in two different stable states. When operating in a pass state (not shown) the current path 106 may exhibit a first resistance that permits current to flow between input terminal 102 and output terminal 104. The sense element 112 may determine that a level of detected voltage is below a threshold at which the pass state is to be switched off. In the event of an increase in current, a predetermined sense voltage level may be detected by sense element 112, which may correspond to a predetermined input current level that indicates a maximum permissible current has been reached. This may trigger the sense element 112 to send a signal via actuator 114 to the current limiter (switch) 110 to change state to a limit state (schematically shown in FIG. 1A) that has a second resistance that is higher than the first resistance. As detailed below, at least some of the circuit components of the current limiter 110 may be implemented as semiconductor devices formed within a silicon substrate.

In various embodiments, the current limiter circuit 100 may be implemented via semiconductor components implemented in a silicon or other semiconductor substrate, including P/N junction diodes, bipolar transistors, and field effect transistors, such as metal oxide semiconductor field effect transistors (MOSFET).

In various embodiments, the current limiter 110 may be implemented as circuitry that includes two electrically parallel current paths in which current is transmitted along a first current path (not shown) that forms a portion of current path 106 when in the pass state, and in which current is passed along a second current path (not shown) that forms an alternate portion of the current path 106 when in a limit state, where the first current path and second current path are electrically in parallel to one another. The first current path may be configured with a first resistance that is lower than a second resistance of the second current path. In particular embodiments, the first current path may include a main silicon controlled rectifier (SCR) and second current path may include a supplementary device coupled to the main SCR, such that the first resistance of the first current path and second resistance of the second current path are determined by the respective resistance of the main SCR and supplementary device, which two devices may be implemented within a common silicon substrate.

Figure 1B:
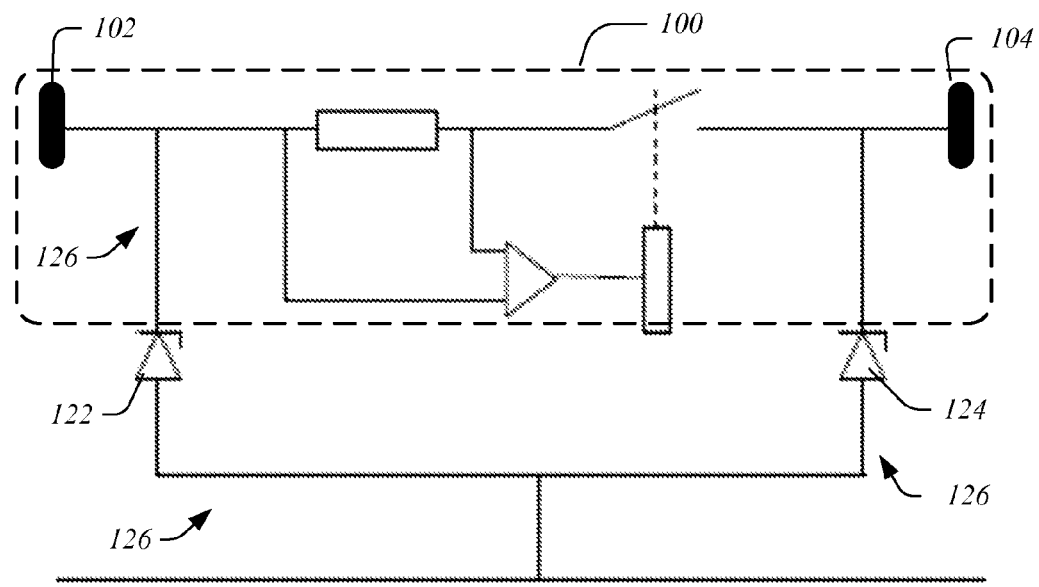
FIG. 1B shows an exemplary protection circuit that includes the current limiter of FIG. 1A.

Turning now to FIG. 1B there is shown a protection circuit 120 that includes the current limiter circuit 100. In this example, the protection circuit 120 also includes an additional current path, current path 126 that is disposed between the input terminal 102 and output terminal 104, and forms a parallel to the current path 106 (shown in FIG. 1A). In operation, the protection circuit 120 may provide current limiting by use of the current limiter circuit 100. In addition, the protection circuit 120 may include a pair of diodes, where the pair of diodes are arranged anti-parallel to one another. As illustrated in FIG. 1B, the protection circuit includes a diode 122 and diode 124 arranged with their anodes connected to one another along the current path 126. The diode 122 and diode 124 may thus limit voltage along the current path 126. Thus, the overvoltage protection is provided by shunting current in an overvoltage condition along the current path 126, which functions as a common terminal.

As noted above, in various embodiments a current limiting circuit may include a plurality of SCRs. As known in the art, an SCR is a current-controlling device that is implemented within four doped semiconductor layers that are arranged in a silicon substrate in an N-P-N-P sequence. An SCR thus forms three separate P-N junctions, and further includes three terminals. The anode terminal of an SCR (SCR anode) is connected to an outer P-Type layer of a PNPN structure, the cathode terminal is connected to an outer N-Type layer, while the gate of the SCR is connected to the P-Type layer (inner) nearest to the cathode. A known SCR has two stable states in which either a large current flows through the SCR when the SCR is in a latched low resistance conduction state (ON state), or no current flows.

In some embodiments, the series pass element may be constructed from a sensitive gate main SCR, or alternative circuitry that performs similar functionality. In particular, the main SCR may have a gate current feed from the anode that is configured such that, as the supply voltage rises when a load is connected, gate current flows from the anode-connected feed into the main SCR until internal regeneration places the main SCR into a latched low resistance conduction state. The main SCR may then remain in a Vt conduction state until the supply or load are removed or the supply voltage is decreased to a value where the SCR de-latches and the current flow reverts to the gate feed resistor and gate-cathode current path.

In various embodiments a current limiter circuit may include, in addition to a main SCR, a latching or "turn-on" circuit that is configured to drive current into a gate of the main SCR to place the main SCR into a low resistance ON state condition. The current limiter circuit may also include a supplementary circuit, such as a silicon controlled switch (SCS). As is known, a SCS can be considered to constitute a silicon controlled rectifier in which the internal N-base of the PNP transistor and collector of the NPN transistor is connected to another external terminal to act as an anode gate.

As detailed in the embodiments below, the turn-on circuit, main SCR and supplementary circuit may be interoperative to control current conduction through the current limiter circuit so that the current limiter circuit switches between two stable states. Under normal current conditions, the current limiter circuit acts to direct current through the main SCR, which remains in an ON state to provide a low resistance path. Under overcurrent conditions, the current limiter circuit acts to direct current through the supplementary circuit, which provides a high resistance path.

In particular embodiments a current limiter circuit may include a series current sense element that is used to detect pass current and located in either the anode or cathode of a main SCR. A voltage that is present across the series current sense element may be used to trigger a smaller, supplementary circuit that includes an SCS, such that the SCS is triggered into an ON state when a predetermined overcurrent condition is present by the load. The SCS may be arranged to starve the main SCR of internal regenerative current, which causes the main SCR to de-generate into an OFF state, leaving the circuit containing the SCS as the sole remaining current path from an input terminal to output terminal. The SCS may have a smaller physical size in comparison to the main SCR and may accordingly present a larger resistance when in the ON state as compared to that of the main SCR. The resistance change in the current limiter between a pass state and limit state may thus be determined by a ratio of the main SCR Vt conduction ON state resistance to the supplementary circuit residual conduction path resistance when the SCS is placed in an ON state.

In various embodiments, current limiting devices constructed as back-to-back or anti-parallel can be used to provide bidirectional current flow. In addition, current limiting devices of the present embodiments may also be implemented on AC power sources. Such current limiters of the present embodiments may not be appropriate for use as a 'safety' fuse, since 'live parts' may be present in different states of operation.

In the following figures, there are presented exemplary implementations of current protection circuitry as well as voltage protection circuitry that may be implemented in a silicon substrate.

Figure 2:
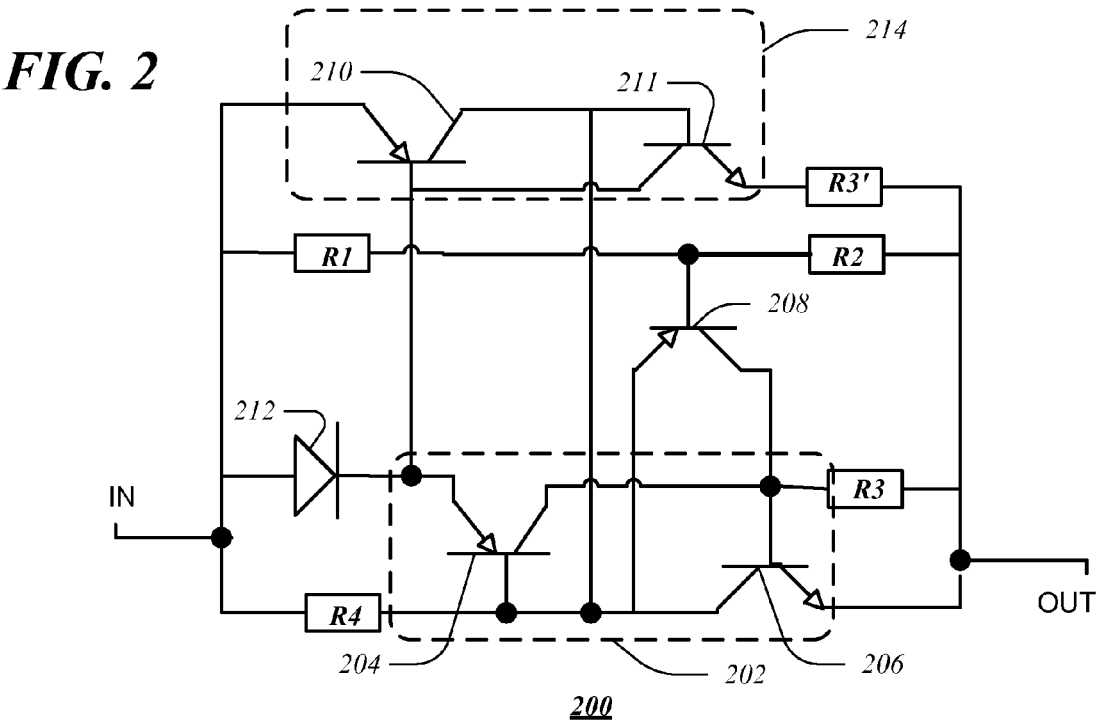
FIG. 2 depicts a circuit diagram of a current limiter circuit according to an embodiment of the disclosure.

FIG. 2 depicts a circuit diagram of a current limiter circuit 200 according to an embodiment of the disclosure. In this embodiment the current limiter circuit 200 may be implemented at least in part in a silicon substrate, and in particular, in a plurality of doped semiconductor layers. The current limiter circuit 200 includes a main SCR 202 that is composed of a first PNP transistor 204 and first NPN transistor 206, in which the collector of the first PNP transistor 204 is connected to the base of the first NPN transistor 206.

The current limiter circuit 200 further includes a second PNP transistor 208 in which the emitter is connected to the base of the first NPN transistor 206. Furthermore, the current limiter circuit 200 includes a third PNP transistor 210 in which the collector is connected to the base of the first PNP transistor 204 and collector of the first NPN transistor 206. The second PNP transistor 208 thus may act as a drive for the main SCR 202. The second PNP transistor 208 in particular may act as a turn-on component for the main SCR202 by functioning to pull current from the cathode gate (P-gate, e.g., base of first NPN transistor 206) of the main SCR 202. In other embodiments, an NPN transistor may be used as a push arrangement to drive the cathode gate. Similarly, a PNP transistor or NPN transistor may be used in a pull or push arrangement to drive the anode gate (N-gate), e.g., base of first PNP transistor 204) of the main SCR 202. An advantage of using an NPN transistor to drive a P-gate of an SCR in a push arrangement is that an NPN transistor generally may exhibit low current gain for initiating an SCR to turn on for the lowest possible base current. The use of an PNP transistor driver to pull from an N-gate of an SCR may incur structural advantages regarding integration into a silicon substrate.

The current limiter circuit 200 further includes a diode 212 whose cathode is connected to the emitter of the first PNP transistor 204. The current limiter circuit further includes a second NPN transistor 211 whose collector is connected to the base of the third PNP transistor 210. The second NPN transistor 211 and third PNP transistor 210 may function as a silicon controlled switch, or SCS 214, whose operation is detailed below. The current limiter circuit 200 may also include a series of resistors, R1, R2, R3, R3' and R4 as shown. Detailed operation of variants of the current limiter circuit 200 are described below.

In brief, in a pass state, the main SCR 202 of the current limiter circuit 200 may reside in an ON state, and thus the current limiter circuit 200 may present a resistance that corresponds to the ON state resistance of the main SCR 202. The current limiter circuit 200 may be configured to switch from a pass state to a limit state by switching the main SCR 202 into an OFF state when input current exceeds a predetermined level, in which current no longer flows through the main SCR. As is known, when the anode current in an SCR is reduced below the level of the holding current, the SCR turns off. In one implementation, this may be accomplished by shunting a portion of current load that may pass through the current limiter circuit 200 in a pass state into a parallel current path that is parallel to a path that includes the main SCR 202. For example, the parallel electrical path may pass through a supplementary circuit as discussed above where the supplementary circuit includes an SCS in which the supplementary circuit exhibits a higher resistance in an ON state of the SCS as compared to the resistance of the main SCR 202 when in an ON state. Thus, when the main SCR 202 is switched into the OFF state remaining current may be routed through the SCS, creating a much higher electrical resistance and thus limiting maximum current.

The current limiter circuit 200 may subsequently act to return the main SCR 202 into an ON state when input current is reduced below the predetermined level.

Figure 2A:
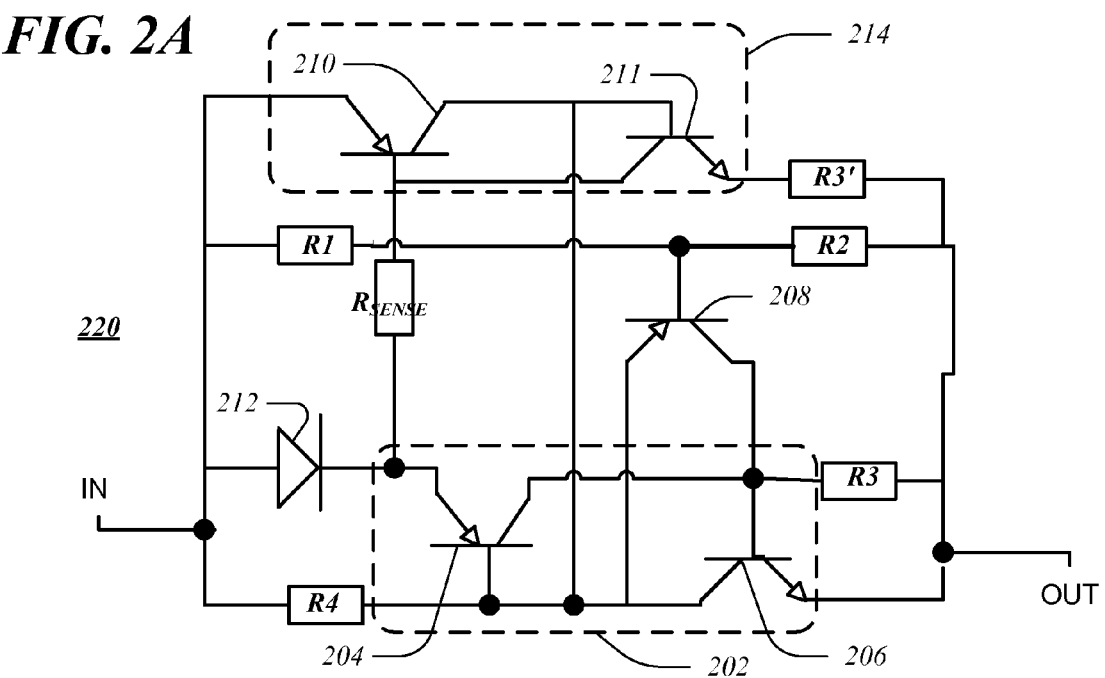
FIG. 2A depicts a circuit diagram of a current limiter circuit according to another embodiment of the disclosure.

FIG. 2A depicts a current limiter circuit 220 according to further embodiments of the disclosure. The current limiter circuit 220 may be considered a variant of the current limiter circuit 200, in which like elements are labeled the same. In addition the arrangement of elements in current limiter circuit 220 is similar to that of current limiter circuit 200. In particular, the second PNP transistor 208 functions as a turn-on component for the main SCR 202 that pulls current from the cathode gate (base of first NPN transistor 206) of the main SCR 202.

The current limiter circuit 220 further includes a sense resistor Rsense that extends between the base of third PNP transistor 210 and the output of the cathode of the diode 212. The Rsense may be used to trigger a switch in the current limiter circuit 220 in order to change the state of the current limiter circuit 220 from a pass state to a limit state, as detailed below.

Figure 2B:
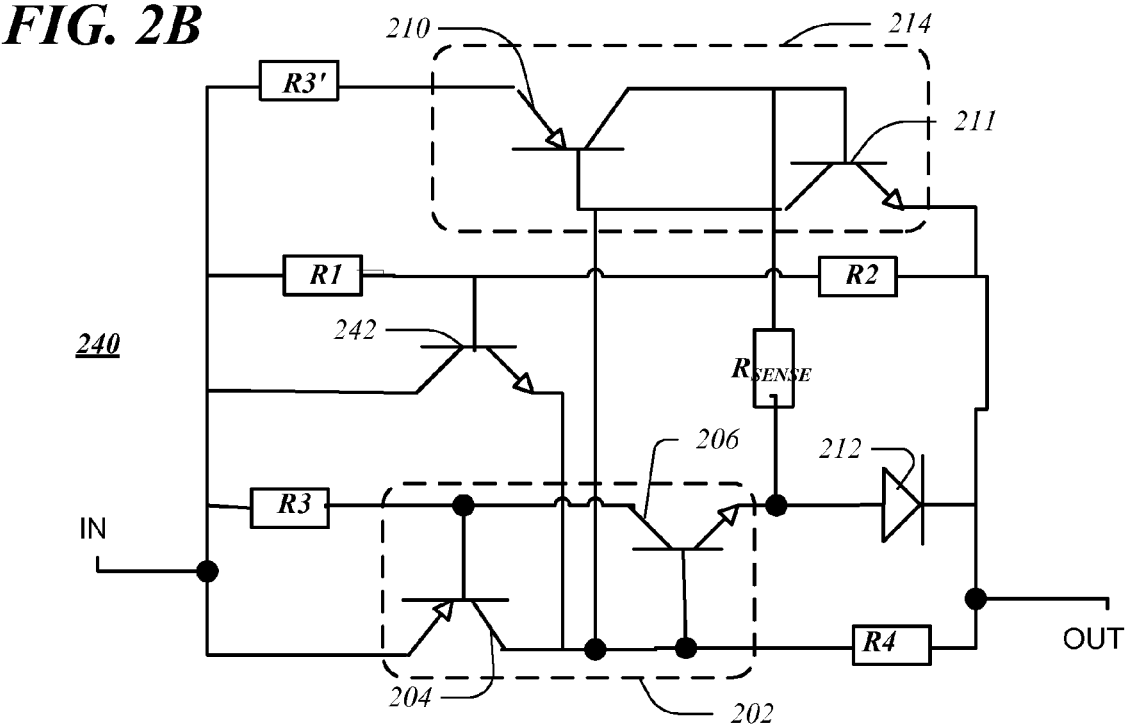
FIG. 2B depicts a circuit diagram of a current limiter circuit according to a further embodiment of the disclosure.

FIG. 2B depicts a current limiter circuit 240 according to further embodiments of the disclosure. The current limiter circuit 240 may be considered a variant of the current limiter circuit 200, in which like elements are labeled the same. The current limiter circuit 240 further includes a third NPN transistor 242 that acts as a turn-on component for the main SCR 202 that pushes current for the cathode gate (base of first NPN transistor 206) of the main SCR 202. The current limiter circuit 240 also includes the sense resistor Rsense that extends between the emitter of first NPN transistor 206 and the collector of third PNP transistor 210. The Rsense may be used to trigger a switch in the current limiter circuit 220 in order to change the state of the current limiter circuit 220 from a pass state to a limit state, as detailed below.

In operation either the current limiter circuit 220 or current limiter circuit 240 may place a respective circuit in one of three possible states: 1) a turn-on condition that is transistor in which turn-on elements become conducting into the main SCR 202; 2) a pass state in which the main SCR 202 is placed in a regenerative ON state that imparts a relatively lower resistance; and 3) a limit state, in which the main SCR 202 degenerates by the action of an SCS 214, such that turn-on current is diverted via the SCS 214 and presents a limit state characterized by a relatively high resistance current path through the SCS 214.

FIGS. 2C-2F present exemplary operation of the current limiter circuit 220 according to various embodiments of the disclosure. The current limiter circuit 220 is illustrated in different states as described above. Although operation of the current limiter circuit 220 is detailed in the figures to follow, it may be readily appreciated that the current limiter circuit 240 may function similarly. The embodiments are not limited in this context.

Figure 2C:
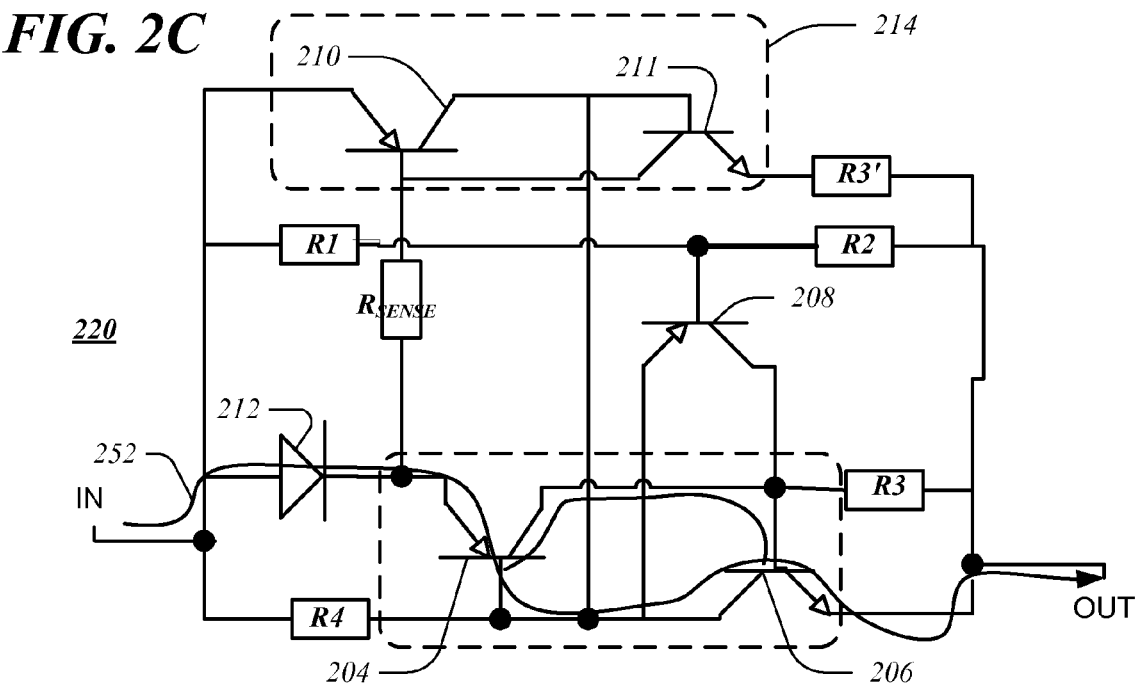
FIG. 2C-2F depict exemplary operation of the current limiter circuit of FIG. 2A.

In FIG. 2C there is shown an example of operation of the current limiter circuit 220 in a pass state in which the main SCR 202 is in an ON state. It may be assumed that the current load through the current limiter circuit 220 is within a normal range in which a conduction path through the main SCR develops as shown by the current path 252. In this scenario, the main SCR 202 is in a regenerative mode and is latched into the ON state so that current travels as shown in the current path 252 through the main SCR 202 between the IN terminal and OUT terminal. In this scenario, the SCS 214 is in an OFF state in which no conduction path exits through the SCS 214.

Figure 2D:
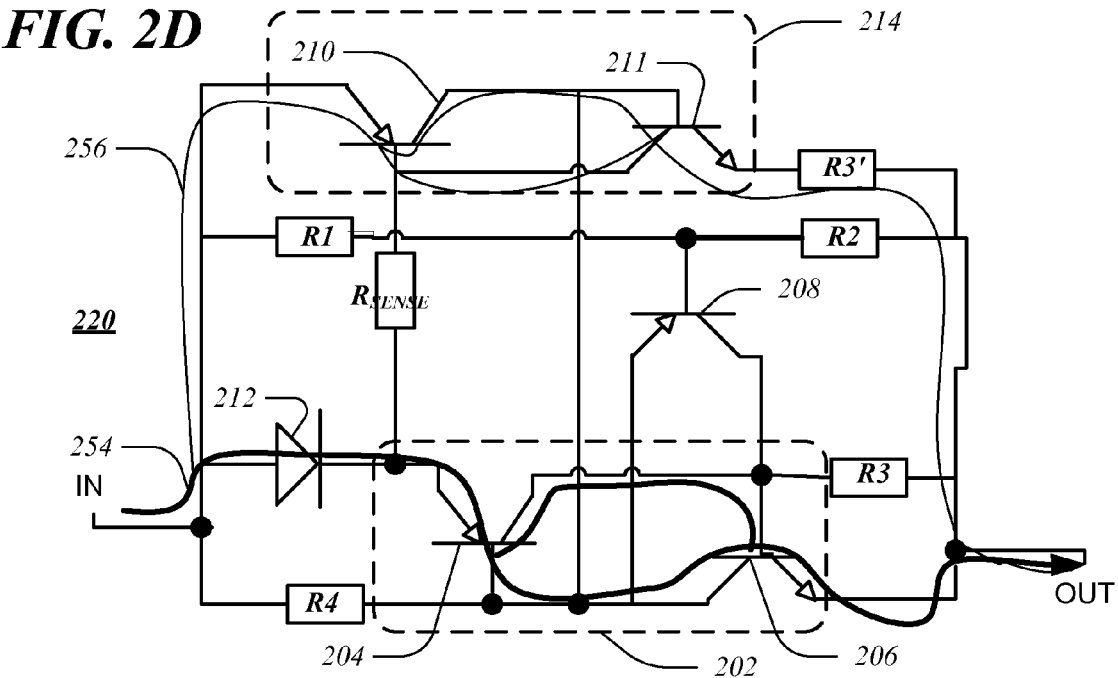

In FIG. 2D there is shown an instance of an overcurrent condition in which the current traveling between the IN terminal and OUT terminal exceeds a predetermined limit, as shown by the current path 254. This limit may correspond to a predetermined sense resistance that passes through the Rsense. In particular, the overcurrent condition may cause a voltage to develop through the diode 212 that is adequate to cause, via Rsense, the SCS 214 to enter an ON state and begin conducting current. When the SCS 214 becomes conducting a current path 256 between IN terminal and OUT terminal may develop as shown. The third PNP transistor 210 then regenerates with the second NPN transistor 211.

Figure 2E:
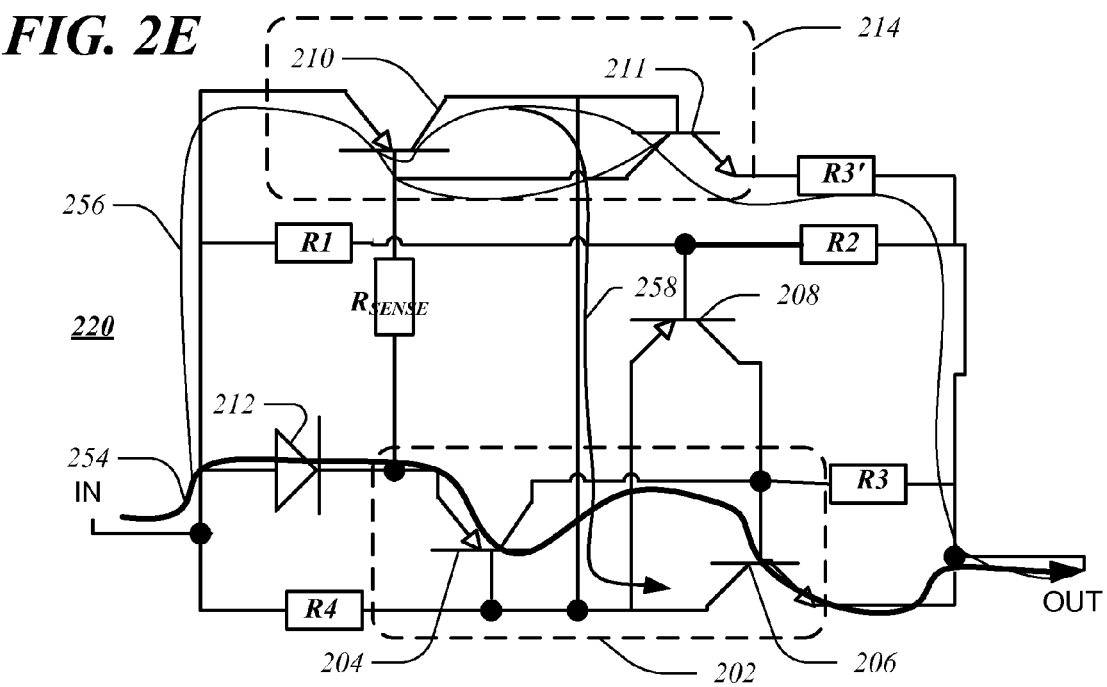

As shown in FIG. 2E, Because the base of the third PNP transistor 210 is connected to the SCR 202 as shown, when the SCS 214 enters the ON state, this regeneration causes, via the conduction path 258, the regenerative current of the main SCR 202 to be diverted from the first PNP transistor 204. As a result, the first PNP transistor 204 degenerates from the first NPN transistor 206, which places the main SCR 202 in an OFF state.

Figure 2F:
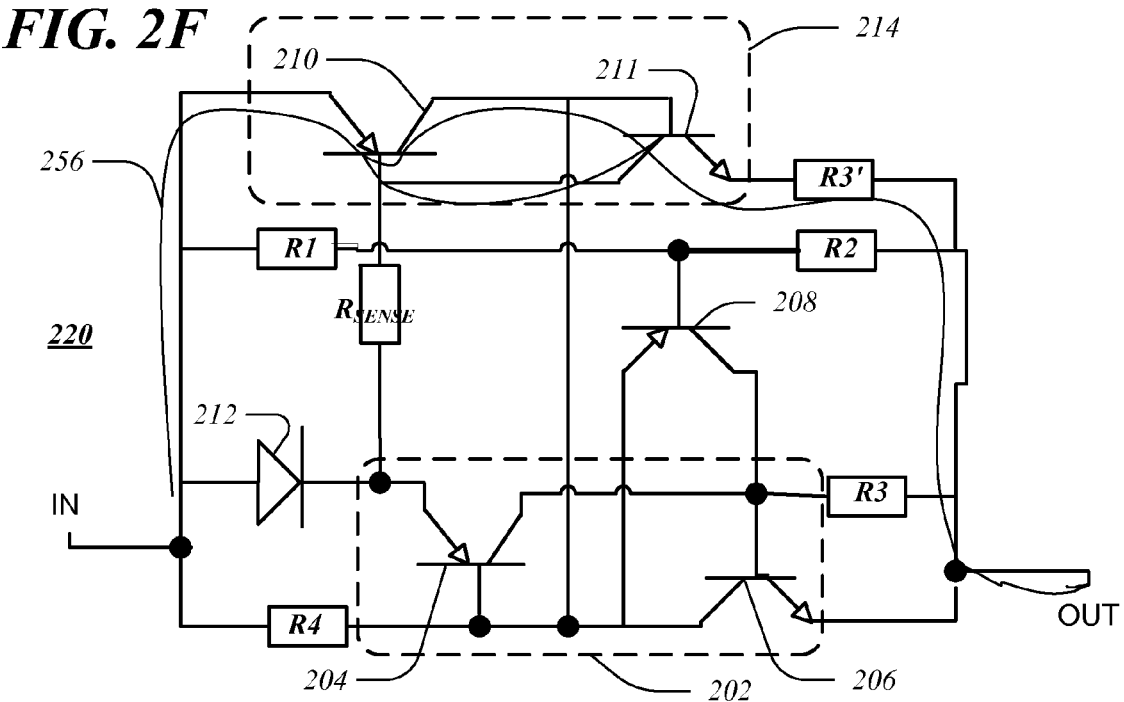

In FIG. 2F there is shown an example of operation of the current limiter circuit 220 in a limit state after the main SCR 202 has been placed in an OFF state as a result of the overcurrent scenario of FIGS. 2D and 2E. Because third PNP transistor 210 and second NPN transistor 211 are in a re-generative state, the main SCR 202 is held in an OFF state, and the second PNP transistor 208 is prevented from pulling trigger current from the anode gate of the main SCR 202.

In a subsequent stage, the current limiter circuit 220 may be arranged to detect when input current falls below a threshold value indicating that the overcurrent condition has ceased, and to return to a pass state when an overcurrent condition ceases. This may be done automatically by the arrangement and intrinsic operation of the components in the current limiter circuit 220 as detailed above. Thus, when the current flowing from IN terminal to OUT terminal is reduced by external influence (such as a fault being cancelled and/or a power supply being switched off, or supply polarity being temporarily inverted) the current through the SCS 214 may fall below an internally-defined holding current of the SCS 214, resulting in natural degeneration of the SCS 214 into an OFF state. When the SCS 214 resumes an OFF state, the diversion of 'turn-on' current and diversion of re-generation current of the main SCR 202 ceases. As a result, the main SCR 202 may again be triggered into the ON state by a turn-on circuit including the second PNP transistor 208, because of the resumption of current into the gate of the main SCR 202.

The relative change in resistance of the current limiter circuit 220 may be tailored according to design of components such as the resistor R3' as well as the SCS 214. For example, the value of resistance for the main SCR 202 when in an ON state may be represented as $R_{SCR}$, and the value of resistance of the SCS may be represented as $R_{SCS}$ such that the pass state resistance is equal to of current limiter circuit 220 is equal to $R_{SCR}$ while the limit state resistance is equal to $R_{SCS}+R3'$ where R3' is the resistance of the resistor R3'. In some examples, the ratio of $(R_{SCS}+R3')/R_{SCS}$ may be in the range of 500:1 to 1000:1. In other embodiments, the ratio $(R_{SCS}+R3')/R_{SCS}$ may be up to 10,000:1. To accomplish this the second NPN transistor 211 may be arranged in a silicon substrate as a four layer structure that has smaller area than, for example, first PNP transistor 204, first NPN transistor 206, or third PNP transistor 210. The third PNP transistor 210 may also have a smaller area than first PNP transistor 204 since just an adequate current to degenerate first PNP transistor 204 and first NPN transistor 206 need by generated from the SCS 214.

Figure 3:
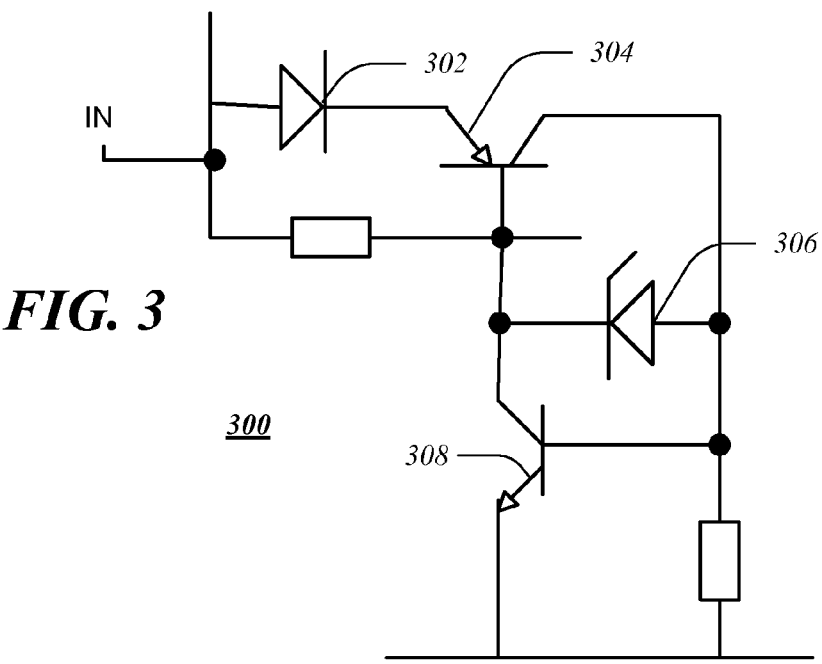
FIG. 3 depicts a circuit diagram of an overvoltage protection circuit according to an embodiment of the disclosure.

FIG. 3 depicts a circuit diagram of an overvoltage circuit 300 according to an embodiment of the disclosure. The overvoltage circuit 300 includes a PNP transistor 304 whose emitter is connected to the cathode of a diode 302, and whose base is connected to the collector of an NPN transistor 308. A first avalanche breakdown diode 306 is configured with its cathode connected to the base of the PNP transistor 304 and collector of NPN transistor 308. The overvoltage circuit 300 may function as a shunt overvoltage stage of a device in which current limiting circuit 200 functions as a series stage. In particular, the overvoltage circuit 300 may function as a "crowbar" circuit in which overvoltage is limited by generating a low resistance path to limit voltage that may develop along a current path.

Figure 3A:
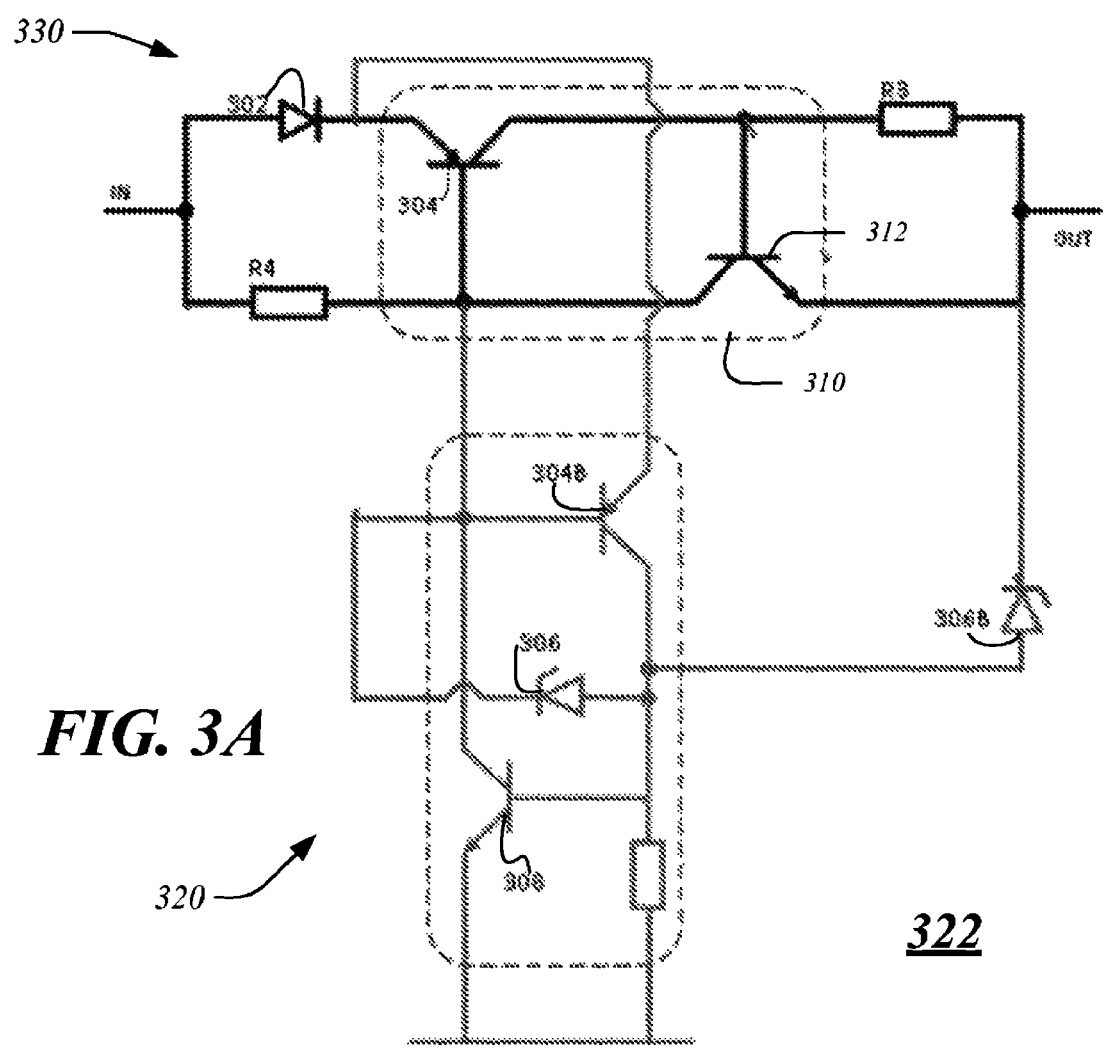
FIG. 3A depicts a circuit diagram of another overvoltage protection circuit according to an embodiment of the disclosure.

FIG. 3A depicts a circuit diagram of a protection circuit 322 that includes an overvoltage protection circuit 320 according to an embodiment of the disclosure. In this example, the protection circuit 322 includes the overvoltage protection circuit 320 in a configuration that is integrated with an overcurrent protection circuit 330, whose operation has generally been described above with respect to FIGS. 2-2F. As will be apparent, just a portion of the overcurrent protection circuit 330 including a main SCR 310 is shown. Thus, the protection circuit 332 may include other components of an overcurrent protection circuit as generally shown in FIGS. 2A-2F. The main SCR 310 includes the PNP transistor 304 and NPN transistor 312 whose operation in a current limiter circuit has been generally discussed above.

The overvoltage protection circuit 320 also includes a first avalanche breakdown diode 306 and second avalanche breakdown diode 306B. The overvoltage protection circuit 320 also includes a PNP transistor 304B whose emitter and base are common to that of PNP transistor 304. The overvoltage protection circuit 320 further includes the NPN transistor 308 as in FIG. 3.

In operation, when a potential (voltage) rises at either IN of OUT terminals with respect to Common (see FIG. 1B) a potential is reached where first avalanche breakdown diode 306 or second avalanche breakdown diode 306B start to avalanche current from IN terminal or OUT terminal through the base-emitter of NPN transistor 308. When the potential further increases at the IN terminal, NPN transistor 308 may start to conduct through the base-emitter of PNP transistor 304. This results in a re-generative action such that the pair of PNP transistor 304/NPN transistor 308 act as an SCR to "crowbar" the IN terminal to Common, such that the voltage is pulled below the trigger voltage and remains below the trigger voltage.

When the potential further increases in an overvoltage condition at the OUT terminal, second avalanche breakdown diode 306B and NPN transistor 308 act to clamp the potential at the OUT terminal to a voltage given by a sum of the avalanche voltage +the emitter-base voltage Vbe for the NPN transistor 308. If under this circumstance there is also simultaneously a potential at the IN terminal, the pair of PNP transistor 304/NPN transistor 308 may re-generate and crowbar the IN terminal as noted above.

Figure 3B:
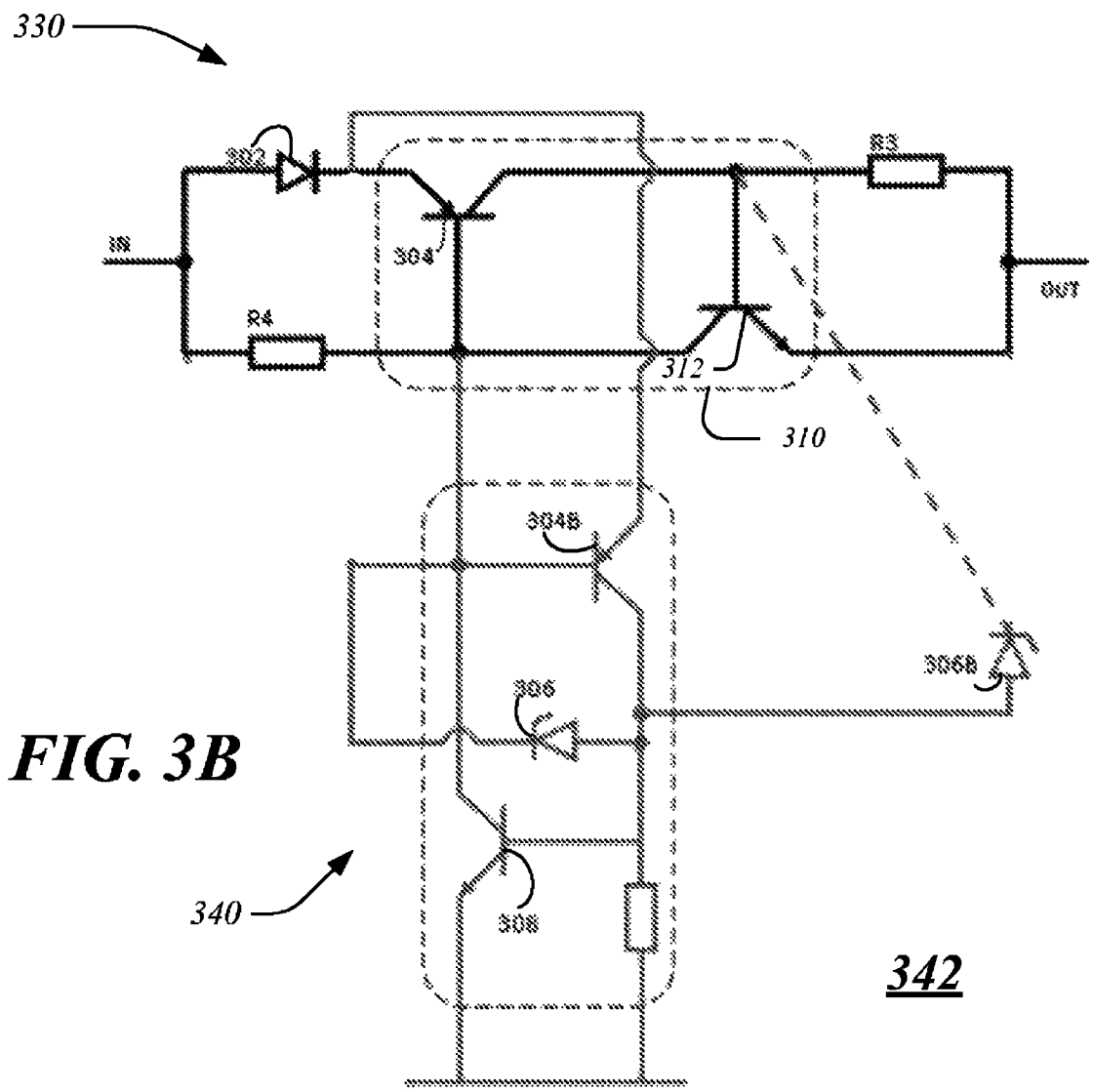
FIG. 3B depicts a circuit diagram of a further overvoltage protection circuit according to an embodiment of the disclosure.

In the embodiment of FIG. 3A the first avalanche breakdown diode 306 is connected to the base of PNP transistor 304 and the second avalanche breakdown diode 306B is connected to the OUT terminal. In additional embodiments other configurations of avalanche breakdown diodes are possible. FIG. 3B depicts another protection circuit 342 that includes the overcurrent protection circuit 330 and an overvoltage protection circuit 340. The protection circuit 362 differs from the protection circuit 322 in that the second avalanche breakdown diode 306B is connected to the collector of PNP transistor 304, not the OUT terminal. Accordingly, current between the second avalanche breakdown diode 306B passes through resistor R3 before reaching the OUT terminal.

Figure 3C:
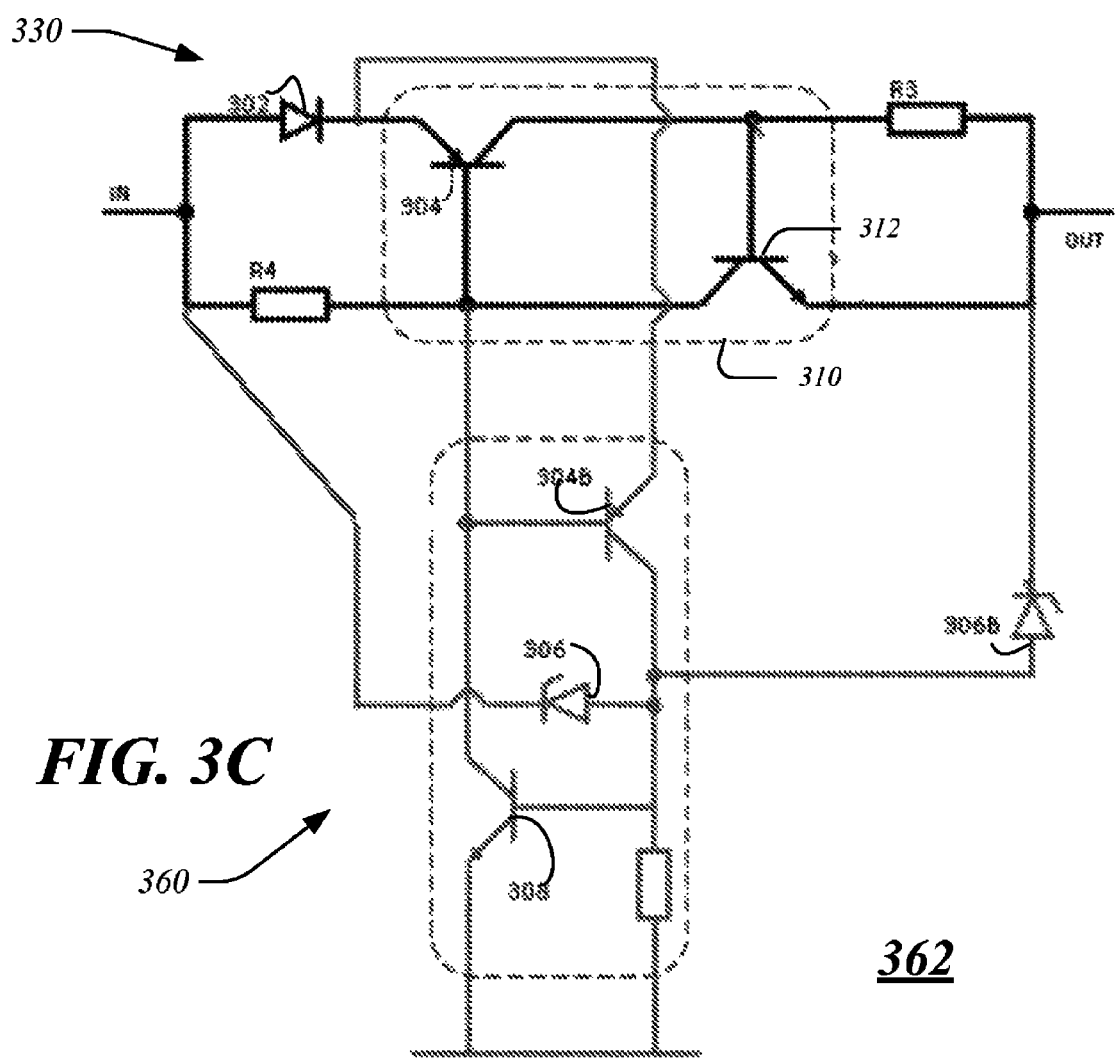
FIG. 3C depicts a circuit diagram of a further overvoltage protection circuit according to an embodiment of the disclosure.

FIG. 3C depicts another protection circuit 362 that includes the overcurrent protection circuit 330 and an overvoltage protection circuit 360. The protection circuit 362 differs from the protection circuit 322 in that the first avalanche breakdown diode 306 is connected to the IN terminal, not to the base of PNP transistor 304.

Figure 3D:
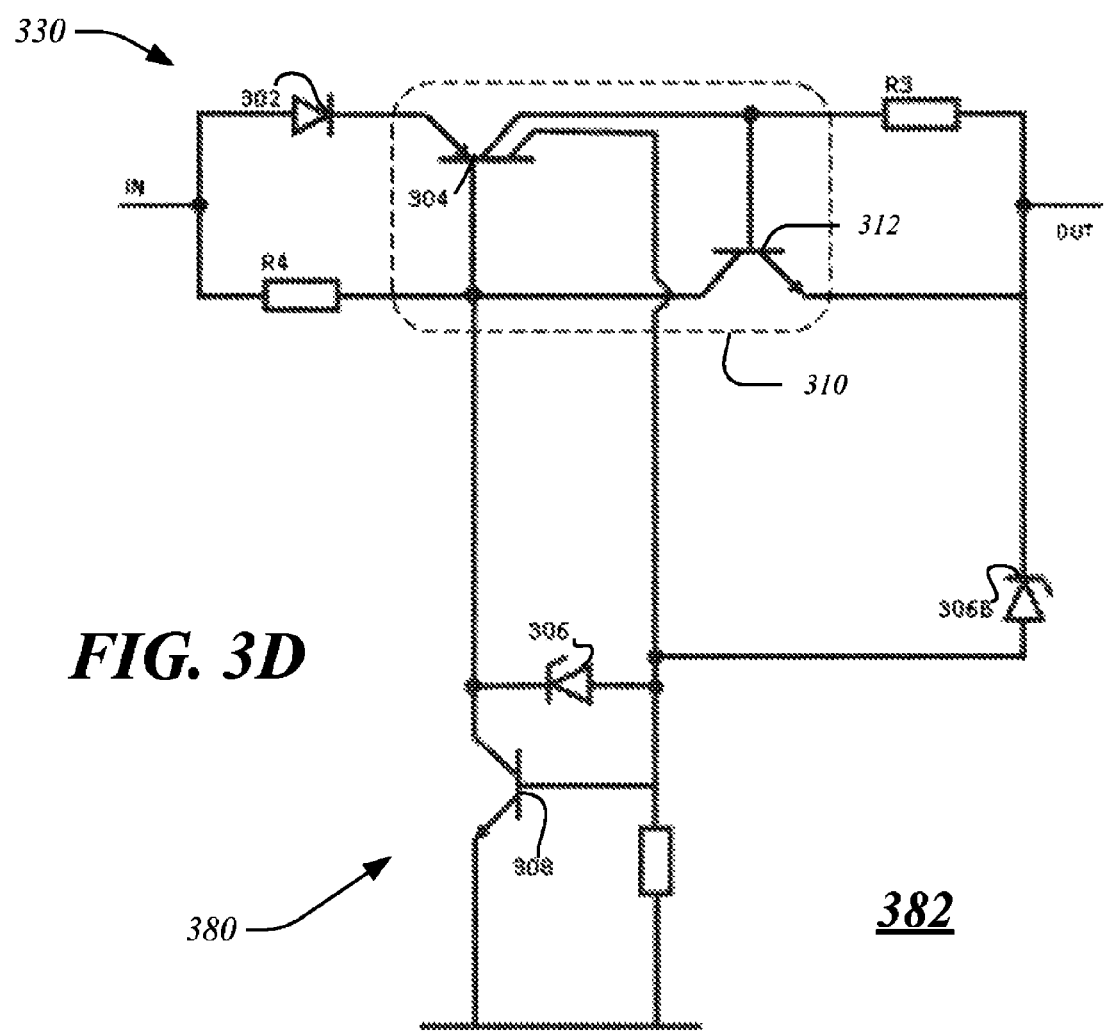
FIG. 3D depicts a circuit diagram of another overvoltage protection circuit according to an embodiment of the disclosure.

FIG. 3D depicts another protection circuit 382 that includes the overcurrent protection circuit 330 and an overvoltage protection circuit 380. The protection circuit 382 differs from the protection circuit 322 in that the PNP transistor 304B is omitted. Thus, the collector of the PNP transistor 304 is connected to the first avalanche breakdown diode 306, second avalanche breakdown diode 306B, and base of NPN transistor 308. Thus, the PNP transistor 304 may be considered to function as a dual collector transistor.

Figure 4:
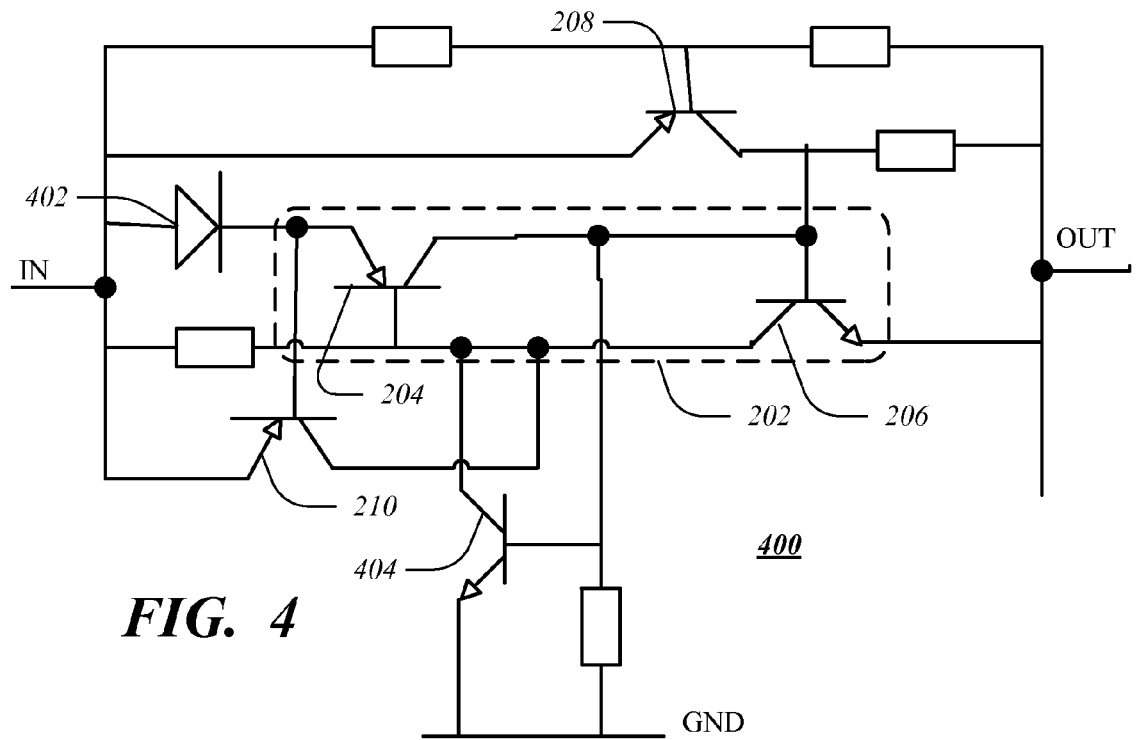
FIG. 4 depicts a circuit diagram of a protection circuit that provides shunt overvoltage protection and series current limitation in accordance with embodiments of the disclosure.
Figure 5:
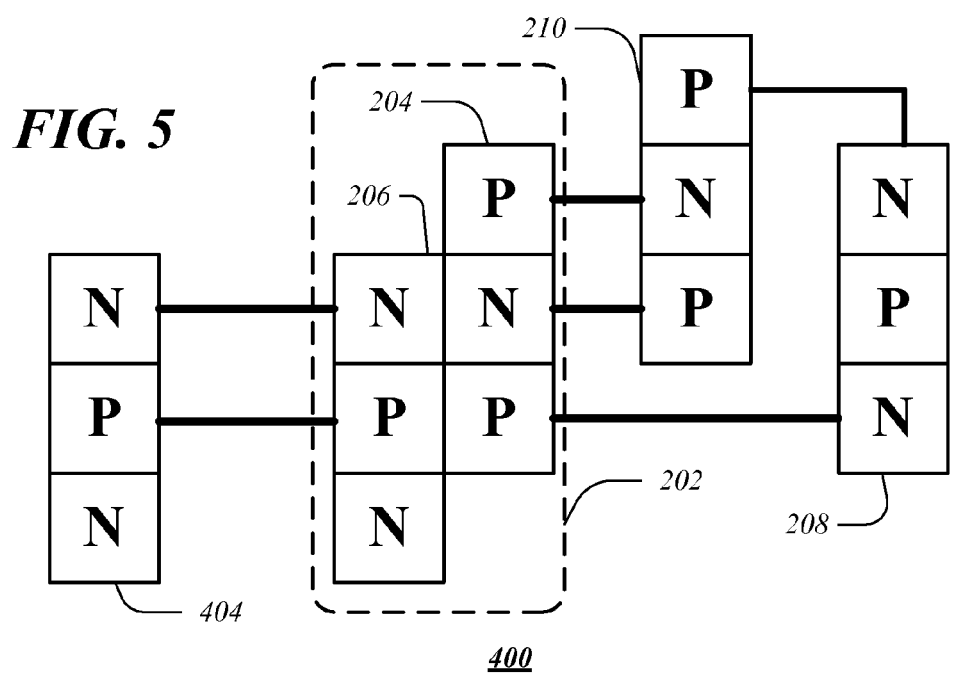
FIG. 5 depicts a semiconductor layer representation of components of the protection circuit of FIG. 4.

FIG. 4 depicts a circuit diagram of another protection circuit 400 that provides shunt overvoltage protection and series current limitation in accordance with embodiments of the disclosure. In one implementation, the protection circuit 400 may implement the functions of the current limiter circuit 200 as well as the overvoltage circuit 300. FIG. 5 depicts a semiconductor layer representation of components of the protection circuit 400. In some embodiments, the protection circuit 400 may be implemented as a five layer device containing five semiconductor layers integrated into a silicon substrate. As illustrated, the protection circuit 400 may include the main SCR 202, as well as second PNP transistor 208 arranged in the manner described above with respect to FIG. 2. The protection circuit 400 may also include a diode 402 having a cathode connected to the emitter of the first PNP transistor 204. In addition, the protection circuit 400 includes an NPN transistor 404 whose collector is connected to the base of first PNP transistor 204 and collector of the first NPN transistor 206.

In summary, the present embodiments provide novel overcurrent protection by implementing current limiting circuitry in a silicon substrate in a manner that provides reversible bistable resistance states in a current limiting circuit. Unlike a fuse element the present embodiments provide the ability to return a current protection circuit to low resistance state after overcurrent condition is resolved.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Furthermore, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Thus, the claims set forth below is to be construed in view of the full breadth and spirit of the present disclosure as described herein.

What is claimed is:

1. An overcurrent protection device integrated into a silicon substrate, comprising:
   an input terminal to receive an input current;
   an output terminal coupled to the input terminal;
   a current limiter circuit integrated into the silicon substrate and arranged between the input terminal and output terminal and comprising:

a series pass element having a pass state characterized by a first electrical resistance and a limit state characterized by a second electrical resistance higher than the first electrical resistance, the series pass element comprising a series current sense element integrated into the silicon substrate and configured to receive the input current and to output a sense voltage based upon the input current, wherein the series pass element is configured to place the current limiter circuit into the limit state when the sense voltage indicates that the input current exceeds a predetermined level, wherein the series pass element comprises a main SCR, wherein the overcurrent protection device further comprises a silicon controlled switch (SCS) that is coupled to the main SCR and configured to trigger into an ON state that starves the main SCR of internal regenerative current when the sense voltage exceeds a predetermined sense voltage level, wherein the main SCR comprises an SCR anode and includes a gate current feed from the SCR anode, wherein as a supply voltage connected to the input terminal rises when a load is connected to the overcurrent protection device, gate current flows from an anode connected feed into the main SCR until internal regeneration turns the main SCR to a latched low resistance conduction state that places the series pass element in the pass state; and a drive transistor coupled to a cathode gate or anode gate of the SCR, the drive transistor configured to turn on the SCR at the cathode gate or anode gate, respectively.

2. The overcurrent protection device of claim 1, wherein the series pass element comprises a first current path characterized by the first electrical resistance and a second current path electrically parallel to the first current path and characterized by the second electrical resistance, wherein the first electrical resistance is determined by a first device within the silicon substrate arranged within the first current path, and wherein the second electrical resistance is determined by a second device within the silicon substrate arranged within the second current path.

3. The overcurrent protection device of claim 2, wherein the series pass element is configured to block current from being transmitted through the first current path when the sense voltage exceeds a predetermined sense voltage level, wherein current passes solely through the second current path in the limit state.

4. The overcurrent protection device of claim 1, wherein the overcurrent protection device comprises a five layer device containing five semiconductor layers integrated into the silicon substrate.

5. The overcurrent protection device of claim 2, wherein the current limiter circuit comprises a series current limiter stage, the overcurrent protection device further comprising a shunt overvoltage stage coupled to the input terminal and output terminal, and arranged along an electrical path that is electrically parallel to the first current path, wherein the shunt overvoltage stage is configured to limit voltage between the input terminal and output terminal when voltage detected at the input terminal or output terminal exceeds a predetermined main voltage level.

6. The overcurrent protection device of claim 5, wherein the shunt overvoltage stage comprises a pair of diodes arranged anti-parallel to one another.

7. The overcurrent protection device of claim 1, wherein the series pass element is configured to switch from the limit state to the pass state when the input current falls below the predetermined level.

8. A method of limiting current using an overcurrent protection device integrated into a silicon substrate, comprising:
transmitting an input current from an input terminal to output terminal via a series pass element integrated into the silicon substrate when the series pass element is in a pass state having a first electrical resistance,
detecting that an input current has reached a predetermined level using a series current sense element;
switching the series pass element to a limit state having a second electrical resistance that is higher than the first electrical resistance; and
transmitting the input current from the input terminal to output terminal via the series pass element in the limit state, wherein the input current does not exceed the predetermined level,
wherein the series pass element comprises a main SCR, wherein the series current sense element is coupled to a silicon controlled switch (SCS) connected to the main SCR, and wherein the switching to the limit state comprises triggering an ON state in the SCS that starves the main SCR of internal regenerative current when the sense voltage exceeds a predetermined sense voltage level,
wherein the main SCR comprises an SCR anode and is configured with a gate current feed from the SCR anode, and
wherein the transmitting the input current when the series pass element is in a pass state comprises:
connecting a supply voltage supplied to the input terminal when a load is connected to the overcurrent protection device; and
flowing gate current from an anode connected feed into the main SCR as supply voltage rises until internal regeneration turns the main SCR to a latched low resistance conduction state that places the series pass element in the pass state,
wherein the overcurrent protection device comprises a drive transistor coupled to a cathode gate or anode gate of the main SCR, the drive transistor configured to turn on the main SCR at the cathode gate or anode gate, respectively.

9. The method of claim 8, further comprising:
detecting that input current is lower than the predetermined level; and
causing the series pass element to switch from the limit state to the pass state.

10. The method of claim 8, wherein the transmitting the input current in the pass state comprises transmitting the input current along a first current path through a first device within the silicon substrate that defines the first electrical resistance, and wherein the transmitting the input current in a limit state comprises transmitting the input current along a second current path through a second device within the silicon substrate, the second current path being electrically parallel to the first current path and defining the second electrical resistance.

11. The method of claim 10, wherein the switching the series pass element to the limit state comprises causing the first current path to open, wherein the input current is transmitted along the second current path and not along the first current path.

12. The method of claim 10, further comprising:
after determining that voltage detected at the input terminal or output terminal exceeds a predetermined main voltage level, limiting voltage between the input terminal and output terminal via a shunt overvoltage stage that is arranged along an electrical path that is electrically parallel to the first current path and second current path.

* * * * *